United States Patent
Shimada

(10) Patent No.: US 10,298,960 B2
(45) Date of Patent: May 21, 2019

(54) VIDEO CODING DEVICE AND VIDEO CODING METHOD

(71) Applicant: FUJITSU LIMITED, Kawasaki-shi, Kanagawa (JP)

(72) Inventor: Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1114 days.

(21) Appl. No.: 14/286,338

(22) Filed: May 23, 2014

(65) Prior Publication Data

US 2014/0355694 A1 Dec. 4, 2014

(30) Foreign Application Priority Data

May 31, 2013 (JP) ................. 2013-116296

(51) Int. Cl.
| | |
|---|---|
| *H04N 19/14* | (2014.01) |
| *H04N 19/80* | (2014.01) |
| *H04N 19/176* | (2014.01) |
| *H04N 19/182* | (2014.01) |
| *H04N 19/147* | (2014.01) |
| *H04N 19/85* | (2014.01) |
| *H04N 19/117* | (2014.01) |
| *H04N 19/86* | (2014.01) |
| *H04N 19/44* | (2014.01) |

(52) U.S. Cl.
CPC ........... *H04N 19/85* (2014.11); *H04N 19/117* (2014.11); *H04N 19/14* (2014.11); *H04N 19/176* (2014.11); *H04N 19/182* (2014.11); *H04N 19/86* (2014.11)

(58) Field of Classification Search
CPC ................. H04N 19/70; H04N 7/26
USPC ..... 375/240.02, 226, 240.15, 240.27, 240.29
See application file for complete search history.

(56) References Cited

U.S. PATENT DOCUMENTS

2013/0051454 A1* 2/2013 Sze .................. H04N 19/70
375/240.02

FOREIGN PATENT DOCUMENTS

| JP | 06-125545 | 5/1994 |
| JP | 2011-250334 | 12/2011 |

OTHER PUBLICATIONS

Fu, "Sample Adaptive Offset in the HEVC Standard", Dec. 2012.*
(Continued)

*Primary Examiner* — Albert Kir
(74) *Attorney, Agent, or Firm* — Fujitsu Patent Center

(57) ABSTRACT

A device for coding a decoded image is provided. The device performs a process of categorizing respective pixels into a plurality of types on the basis of pixel values of the decoded image, calculating a correction value for a pixel for each of the types, and correcting the pixel value of the decoded image on the basis of the correction value on the decoded image obtained by performing decoding after coding an original image, the respective types are further categorized into an edge group in which an edge direction of the original image and an edge direction of the decoded image are the same and into a noise group in which an edge direction of the original image and the edge direction of the decoded image are different, a higher priority is given so that a correction amount for the noise group becomes greater, and the correction value is calculated.

12 Claims, 15 Drawing Sheets

(56) References Cited

OTHER PUBLICATIONS

ITU-T, Series H: Audiovisual and Multimedia Systems, Infrastructure of audiovisual services—Coding of moving video. "Advanced video coding for generic audiovisual services", ISO/IEC 14496-10 (MPEG-4 Part 10) / ITU-T Rec.H.264 (Mar. 2010).
Bross, Benjamin et al., "High Efficiency Video Coding (HEVC) text specification draft 9", JCTVC-K1003_v9, (Oct. 10-19, 2012).

* cited by examiner

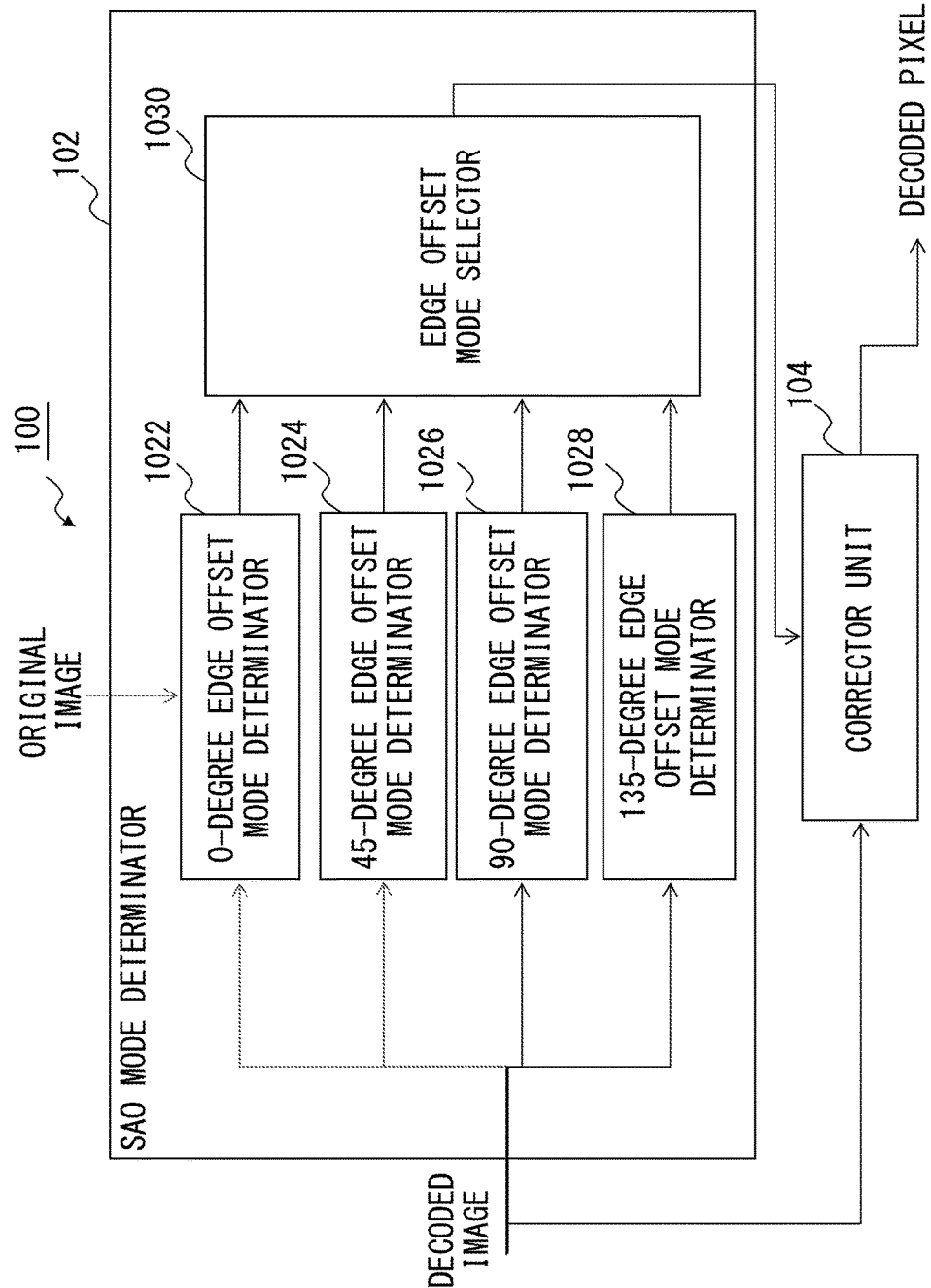
F I G. 5

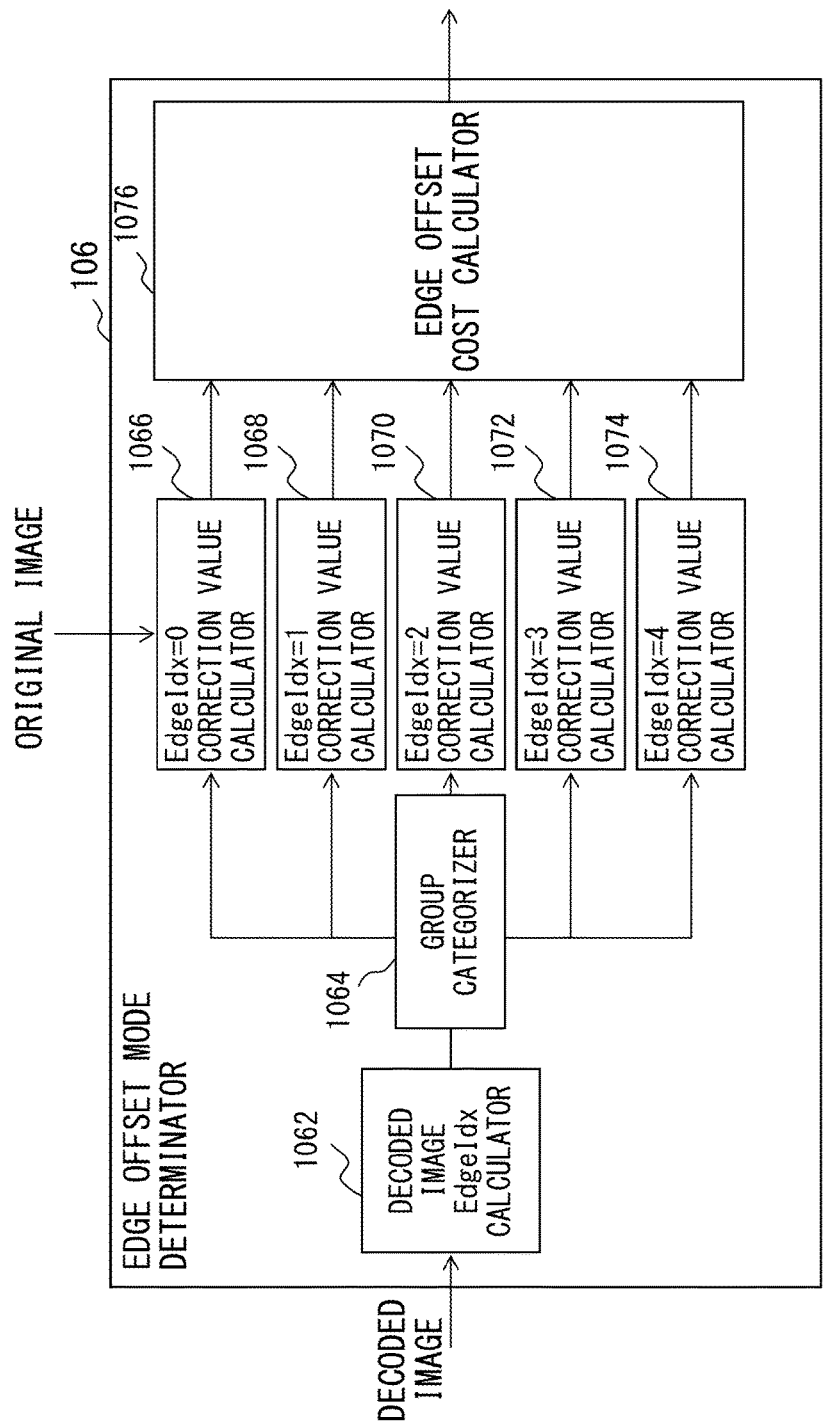
F I G. 6

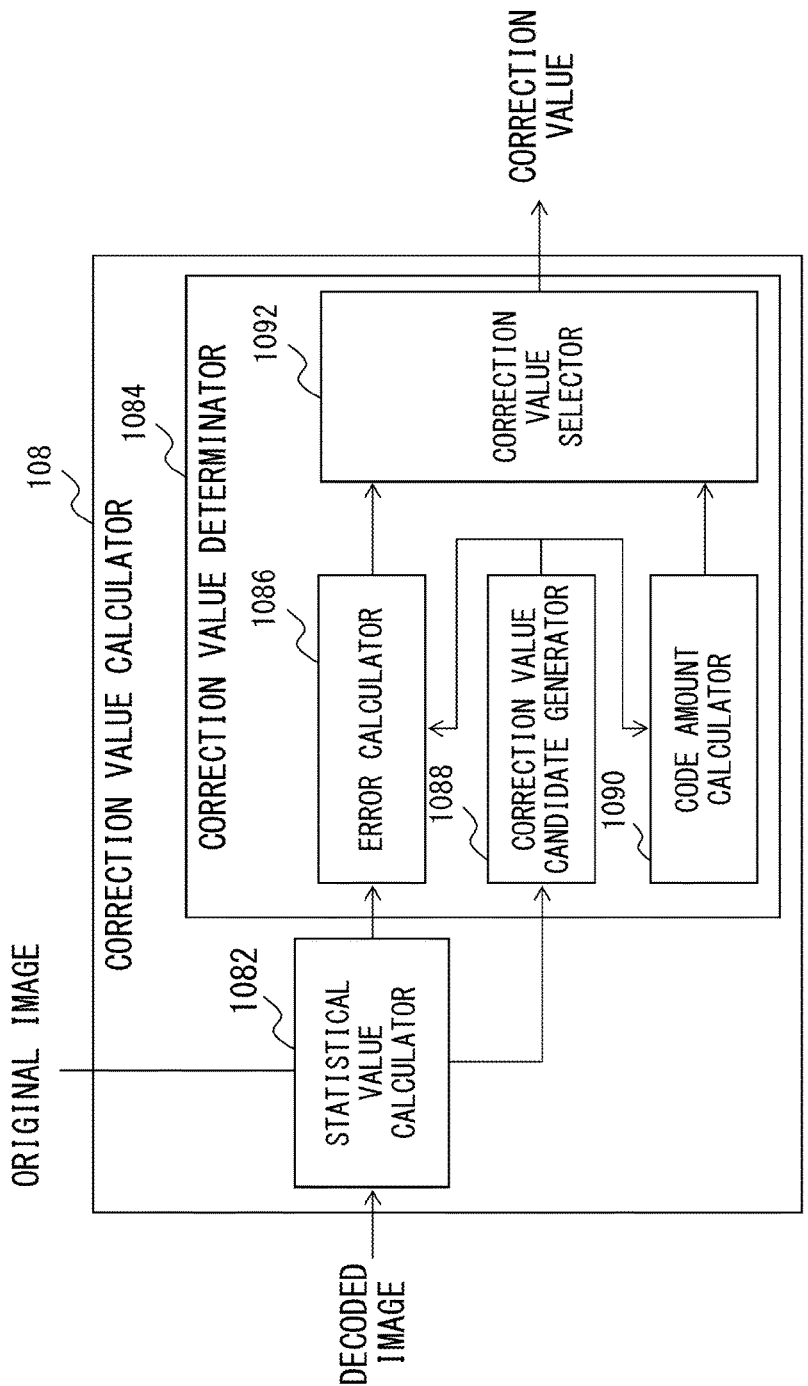
F I G. 7

FIG. 8

| | ORIGINAL IMAGE | DECODED PIXEL | GROUP |
|---|---|---|---|
| ORIGINAL IMAGE AND DECODED PIXEL HAVE SAME EDGE DIRECTIONS | | | EDGE GROUP |
| ORIGINAL IMAGE AND DECODED PIXEL HAVE DIFFERENT EDGE DIRECTIONS | | | NOISE GROUP |

VIDEO CODING DEVICE AND VIDEO CODING METHOD

CROSS-REFERENCE TO RELATED APPLICATIONS

This application is based upon and claims the benefit of priority of the prior Japanese Patent Application No. 2013-116296, filed on May 31, 2013, the entire contents of which are incorporated herein by reference.

FIELD

The embodiments discussed herein are related to a coding device and a coding method.

BACKGROUND

In video coding in recent years, as represented by ITU-T Rec. H.264|ISO/IEC14496-10 Advanced Video Coding (H.264/MPEG-4 AVC, referred to as "H.264" hereinafter), which is one standard of a video data compression coding scheme recommended by the International Telecommunication Union (ITU) and which is recommended by the International Organization for Standardization (ISO) as part of MPEG-4 (ISO/IEC 14496, MPEG-4 Part 10 Advanced Video Coding), a technique of performing a filter process named in-loop filtering on decoded images is applied so as to enhance the image quality. In H.264, a filter process named de-blocking filtering is employed so as to reduce block distortion.

In High Efficiency Video Coding (HEVC), which is one of the latest video coding schemes yielding a compression ratio higher than that of H.264, a Sample Adaptive Offset (SAO) process is performed after the filter process using a de-blocking filter in order to make boundaries between blocks less noticeable. In the SAO process, a correction is performed on a decoded image to which a de-blocking filter process has applied so that the decoded image becomes closer to the original image and the signal-to-noise ratio (S/N ratio) is improved.

The SAO process performs a correction process, in accordance with the shape of an edge, on a decoded image obtained by a filter process performed by a de-block filter. In the SAO process, Pixel of images are categorized into groups in accordance with edge shapes around each pixel, a correction value is obtained so that the square error of decoded images is minimized, and correction values are added for pixels of each group. In this process, it is ruled that correction values have a fixed correction direction and corrections are only made in the direction by which edges are bent.

There is a problem in which because it is ruled to perform correction only in the direction of bending of edges in the SAO process in an encoder, square errors can be reduced between an original image and a decoded image by employing a correction value calculation method in the SAO process while edges are smoothed so as to sometimes cause blurring depending upon distribution of coding errors around edges.

Non-Patent Document 1: ISO/IEC 14496-10 (MPEG-4 Part 10)/ITU-T Rec.H.264

Non-Patent Document 2: Thomas Wiegand, Woo-Jin Han, Benjamin Bross, Jens-Rainer Ohm, Gary J. Sullivan, "Working Draft 8 of High-Efficiency Video Coding" JCTVC-J1003, 2012-07 Stockholm

SUMMARY

According to one aspect, a video coding device generates a predicted error signal from a comparison between a decoded image obtained by performing decoding after coding an original image and the original image and codes the predicted error signal. The video coding device includes a processor configured to calculate a decoded image edge index that represents an edge shape of the decoded image, to calculate an original image edge index that represents an edge shape of an original image corresponding to the decoded image, to compare the decoded image edge index and the original image edge index, and to categorize the edge shape of the decoded image into an edge group in which an edge direction of the original image and an edge direction of the decoded image are the same or into a noise group in which an edge direction of the original image and an edge direction of the decoded image are different, to calculate statistical amounts related to an edge shape of the original image and an edge shape of the decoded image for each of the edge group and the noise group, to obtain a weighting sum of the statistical amounts for the edge group and the noise group in such a manner that a contribution of the statistical amount corresponding to the edge group is smaller than the statistical amount corresponding to the noise group, to determine a correction value on the basis of the weighting sum, to generate a corrected decoded image by adding the correction value to the pixel value of the decoded image, to detect a motion vector of the original image, to performs generation of the predicted error signal from the motion vector and the corrected decoded image, and to code the predicted error signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a functional block diagram of an SAO handler in a comparison example;

FIG. 6 is an example of a functional block diagram of an edge offset mode determinator in the comparison example;

FIG. 7 illustrates an example of a functional block diagram of a correction value calculator in the comparison example;

FIG. 8 illustrates an example of categorization of edge shapes of original images and decoded pixels;

DESCRIPTION OF EMBODIMENTS

Figure 1:
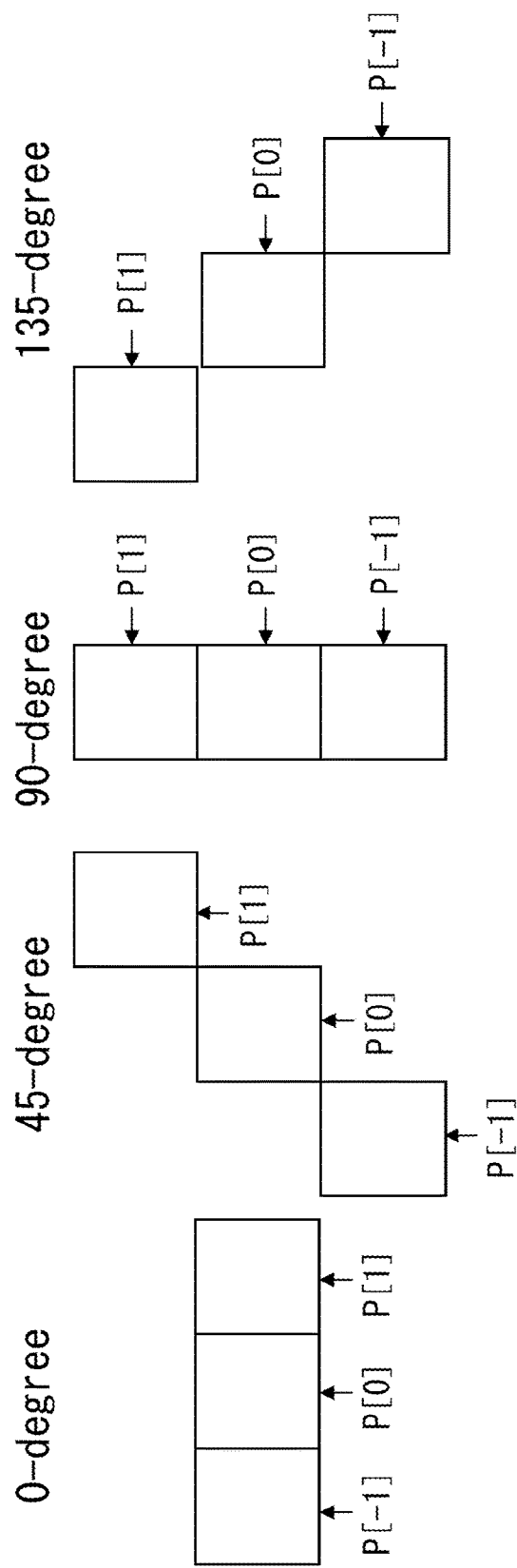
FIG. 1 illustrates positional relationships between a pixel to be processed and two pixels around the pixel to be processed.

Hereinafter, a video coding device that suppresses blurring caused by the SAO process will be explained by referring to the drawings. A video coding device, a video coding method, and a video coding program that suppress blurring caused by the SAO process in an encoder are provided.

<About Video Coding>

First, video coding in High Efficiency Video Coding (also referred to as HEVC hereinafter) will be explained. In video coding in HEVC, an image is divided into blocks, pixels included in the blocks are predicted so as to code a predicted difference, and thereby a high compression ratio is achieved. The prediction mode in which predicted pixels are constituted from pixels in a coding target picture is referred to as intra prediction, and the prediction mode in which predicted pixels are constituted from reference pixels, which are pixels that were previously coded, is referred to as inter prediction. The inter prediction is also referred to as motion compensation. A predicted difference image further receives a frequency transform by an orthogonal transform such as a Discrete Cosine Transform (DCT), and the output coefficient of the orthogonal transform is quantized so that the information amount is reduced. Quantization is an irreversible process, and errors caused by quantization are coding distortion. Because processes are executed in units of blocks in an orthogonal transform as a general rule, quantization distortion also sometimes emerges in the shape of blocks. This noise in the shape of blocks is referred to as block noise. In order to remove this noise, a smoothing filter process named a de-blocking filter is performed on boundaries between blocks of a decoded image. Further, in the latest HEVC, quantization distortion is corrected by performing a filter process named SAO on an image that has received a de-blocking filter.

In video coding in HEVC, in order to further enhance the coding efficiency, a prediction signal is generated by using a signal of a pixel that is adjacent in the same window as a target block and that has already been reproduced (a result of restoring compressed image data) and a difference signal obtained by subtracting that signal from the signal of a target block is coded for prediction coding in a window. For prediction coding across windows, an image signal that is in a window other than a target block and that has already been reproduced is referred to, motion is corrected, a prediction signal is generated, and a difference signal obtained by subtracting the generated prediction signal from the signal of the target block is coded. Specifically, in the in-window prediction coding of ITU-T Rec. H.264|ISO/IEC 14496-10 Advanced Video Coding 1-1.264/MPEG-4 AVC, also referred to as H.264 hereinafter), a method is employed in which the value of the pixel that is adjacent to a coding target block and that has already been reproduced is extrapolated to a prescribed direction so as to generate a prediction signal.

Hereinafter, explanations will be given for a process performed on a portion of pixels in one block in encoder; however, the average value of an entire block may be used in an actual process.

The outline of SAO will be explained.

First, operations of a decoder will be explained. In the SAO process in a decoder, a grouping process is performed on each pixel of an image after the de-blocking filter. As methods of a grouping process, a plurality of methods are defined, and reports are made from an encoder in units of blocks that are referred to as CTB. Methods for a grouping process are roughly categorized into two methods, a method that uses band offset and a method that uses edge offset.

The method using band offset is a method in which categorization is conducted on the basis of absolute values of pixels. In class categorization in hand offset, a range is divided into thirty-two segments at equal intervals on the basis of ranges of pixel values. Each interval is treated as a class in hand offset, and a correction value is calculated for each class.

The method using edge offset uses two pixels out of the eight pixels surrounding a pixel to be processed, considers as the shape of the edge the magnitude relationships between the pixel values of two pixels adjacent to the pixel to be processed, and performs grouping on the basis of the shape of the edge (edge shape). The number of pixels used in the method using edge offset is not limited to two, and there is also a method based on the magnitude relationship between four adjacent pixels. However, descriptions of the method based on four adjacent pixels will be omitted because it would be easy for those skilled in the art to expand the following descriptions to a method based on the magnitude relationships between four adjacent pixels. A pixel value used herein is a result of quantifying light intensities or colors. Hereinbelow, only edge offset will be considered. As edge offsets, four types that are different depending upon the angles of calculated edges exist.

FIG. 1 illustrates positional relationships between a pixel to be processed and two pixels around the pixel to be processed. FIG. 1 illustrates four types of edge offsets. As illustrated in FIG. 1, in a decoded image after de-blocking, one block for example includes 64×64 pixels. In High Efficiency Video Coding (HEVC), the number of pixels in a block is defined so that the number can be selected from among 64×64 pixels, 32×32 pixels, and 16×16 pixels.

The four types differ in the positions of two adjacent pixels for calculating the edge shape. As illustrated in FIG. 1, the angles resulting from arranging two pixels out of the eight pixels around a pixel to be processed are 0 degree, 90 degrees, 45 degrees, and 135 degrees. The pixel values of the three pixels for which the edge shape is calculated are treated as P[−1], P[0] and P[1], and P[0] is treated as a process target pixel. EdgeIdx, which is the shape of the edge, is defined as below by using a function Sign where $\text{Sign}(x)=1$ if $x>0$ and $\text{Sign}(x)=-1$ $x<0$ where x is a value that can be a positive or negative value. In other words, $$eidx = 2 + \text{Sign}(P[0] - P[-1]) + \text{Sign}(P[0] - P[1]) \tag{1}$$

is used and when eidx0=2, $$\text{EdgeIdx} = 0 \tag{2}$$

is satisfied. And when edix<2, $$\text{EdgeIdx} = eidx + 1 \tag{3}$$

is satisfied. Further, when edix>2, $$\text{EdgeIdx} = eidx \tag{4}$$

is satisfied. Respective pixels are grouped into a plurality of types using a grouping method specified by the encoder. In the case of edge offset, respective pixels are categorized into five types in accordance with EdgeIdx.

Figure 2:
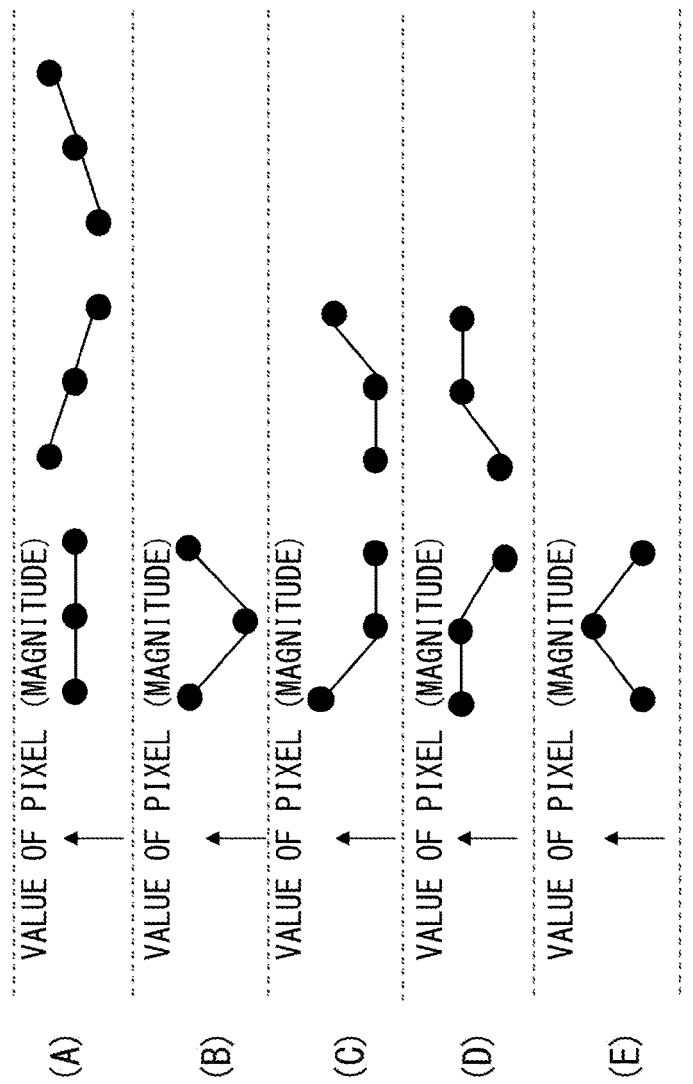
FIG. 2 illustrates magnitude relationships between the pixel values of a pixel to be processed and the surrounding pixels when EdgeIdx=0, 1, 2, 3, and 4.

FIG. 2 illustrates magnitude relationships between the pixel values of the pixel to be processed and the surrounding pixels.

(A) of FIG. 2 illustrates an example of the magnitude relationships of pixel values between the pixel to be processed and the surrounding pixels when EdgeIdx=0. In (A) through (E) of FIG. 2, the three dots represent P[−1], P[0], and P[1], respectively. When EdgeIdx=0, the lines connecting the three dots are straight.

(B) of FIG. 2 illustrates an example of the magnitude relationships of pixel values between a pixel to be processed and the surrounding pixels when EdgeIdx=1. In this case, the line connecting the three dots is in the shape of the letter "V".

(C) of FIG. 2 illustrates an example of the magnitude relationships of pixel values between a pixel to be processed and the surrounding pixels when EdgeIdx=2. In this case, the pixel value of each of the center dots is equal to that of the right or left pixel, and the pixel value of the remaining pixel is higher than those of the other two pixels.

(D) of FIG. 2 illustrates an example of the magnitude relationships of pixel values between a pixel to be processed and the surrounding pixels when EdgeIdx=3. In this case, the pixel value of each of the center dots is equal to that of the right or left pixel, and the pixel value of the remaining pixel is lower than those of the other two pixels.

(E) of FIG. 2 illustrates an example of the magnitude relationships between a pixel to be processed and the surrounding pixels when EdgeIdx=4. In this case, the line connecting the three dots is in the shape of a letter "V" that has been turned upside down.

Respective pixels are grouped by using a grouping method specified by the encoder. In the case of edge offset, respective pixels are categorized into five types in accordance with EdgeIdx.

The encoder reports to the decoder the correction value corresponding to each type in units of CTBs. The decoder adds, to the pixel to be processed, correction values corresponding to categorized groups. The positive or negative sign is set beforehand for a correction value.

Figure 3:
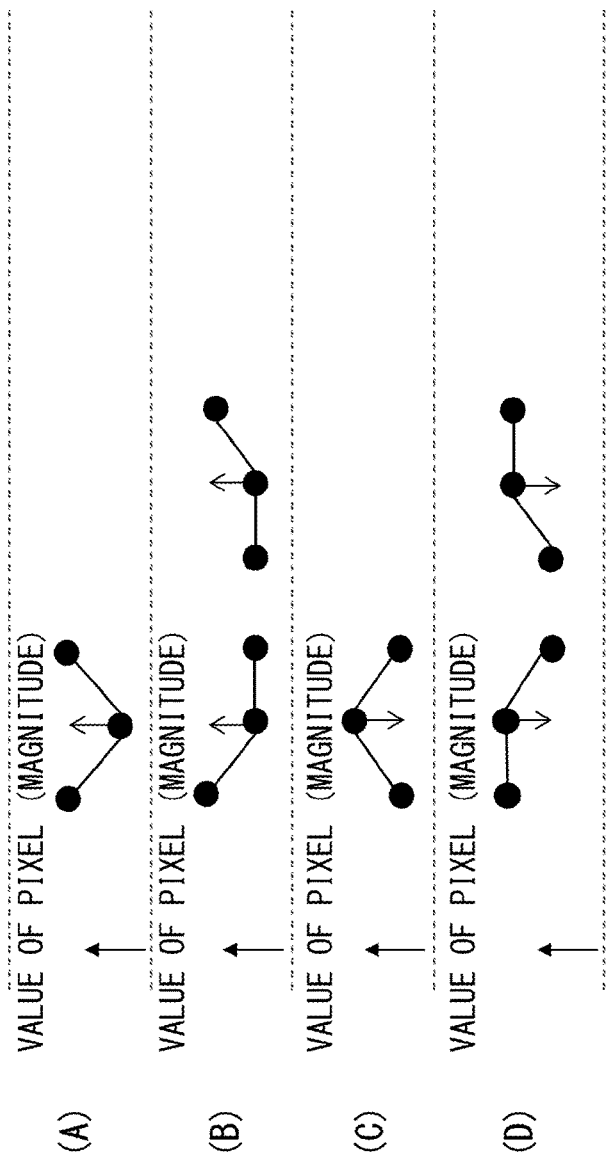
FIG. 3 illustrates an example of corrections of pixel values in a pixel to be processed when EdgeIdx=0, 1, 2, 3, and 4.

FIG. 3 illustrates an example of corrections of pixel values in a pixel to be processed.

(A) of FIG. 3 illustrates an example of a correction of the pixel value of the pixel to be processed when EdgeIdx=1. In this case, a correction is performed so as to make pixel value P[0] higher in the pixel to be processed.

(B) of FIG. 3 illustrates an example of a correction of the pixel value of the pixel to be processed when EdgeIdx=2. In this case, a correction is performed so as to make pixel value P[0] higher in the pixel to be processed.

(C) and (D) of FIG. 3 illustrate examples of corrections of the pixel value of the pixel to be processed when EdgeIdx=3 and EdgeIdx=4. In these cases, corrections are performed so as to make pixel value P[0] lower in the pixel to be processed.

In other words, as illustrated in (A) through (D) of FIG. 3, in the SAO process in High Efficiency Video Coding (HEVC), the correction direction is fixed to the direction in which edges are bent.

Also, it is ruled that a correction value is zero when EdgeIdx=0. The above is the outline of the SAO process.

The encoder determines correction values and grouping methods so that pixel values after the SAO process become closer to those of the original image. When quantization noise can be corrected by correction values, the quality of images after the SAO process is enhanced.

Figure 4:
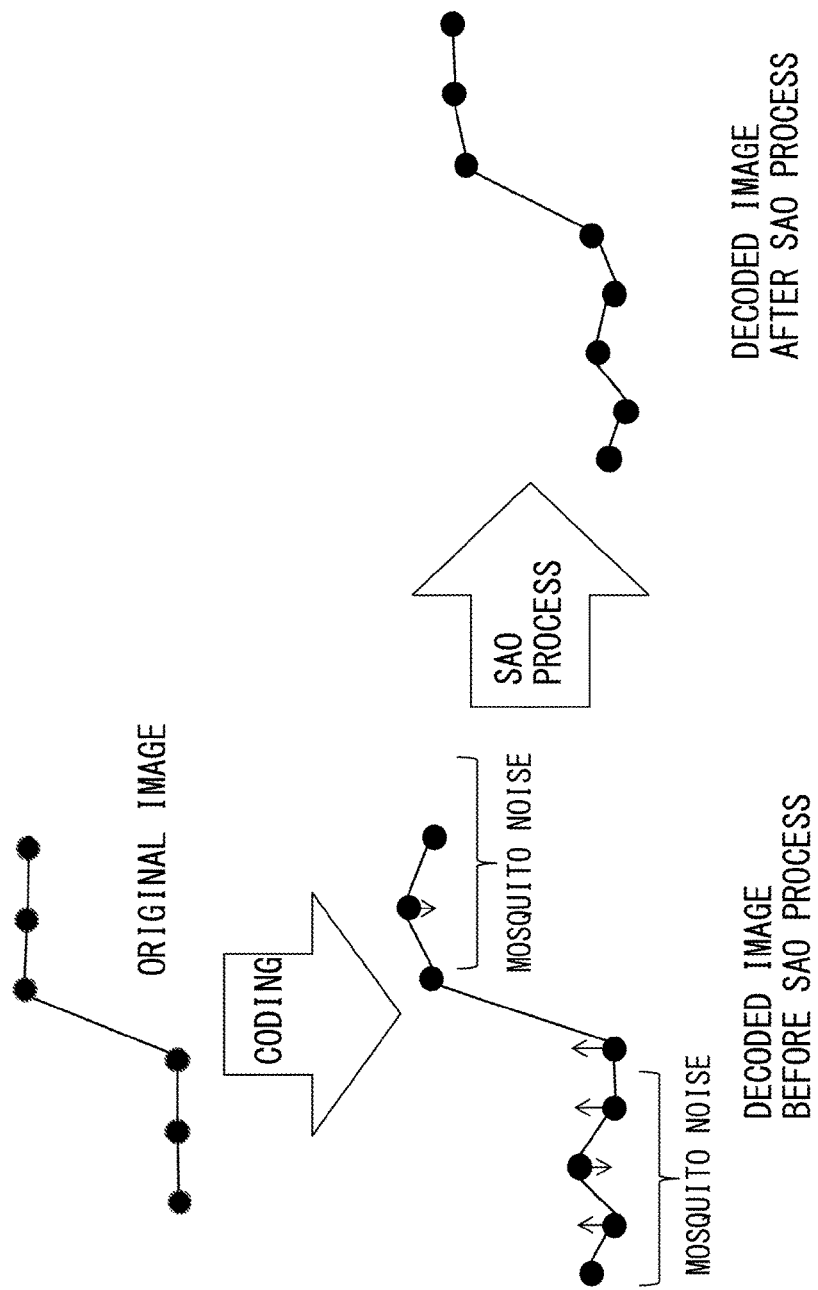
FIG. 4 illustrates an example of the effects of SAO.

FIG. 4 illustrates an example of the effects of SAO.

As illustrated in FIG. 4, edge offset can be effective particularly in correcting mosquito noise occurring around edges.

Explanations will be given for a method of calculating a correction value of an encoder. In the SAO process, a correction value is calculated on the basis of the reference of the optimization of rate distortion so as to optimize the relationship of tradeoff between a code amount and an error between a decoded image after the SAO process and the original image. More specifically, when an error between a decoded image and the original image is represented by Distortion and the code amount of process target CTB is represented by Bit, a correction value and a grouping method are selected so that amount Cost defined by the following equation is minimized. A code amount may be the number of bits.

$$\text{Cost}=\text{Distortion}+\lambda\times\text{Bit} \quad (5)$$

Hereinafter, Distortion is referred to as a coding error. Also, for simplicity, it may be assumed that coding error Distortion is minimized. In order to facilitate calculations, a square error is used for distortion as a general rule; however, Sum of absolutes. (SAD) may be used. Also, a peak signal-to-noise ratio (PS/NR) may be used or a reference such as Structural SIMilarity (SSIM) may be used.

The SAO process in an encoder will be explained by referring to FIG. 5.

FIG. 5 illustrates an example of a functional block diagram of an SAO handler 100 in a comparison example.

The SAO handler 100 in the comparison result includes an SAO mode determinator 102 and a corrector 104.

The SAO mode determinator 102 further includes a 0-degree edge offset mode determinator 1022, a 45-degree edge offset mode determinator 1024, a 90-degree edge offset mode determinator 1026, a 135-degree edge offset mode determinator 1028, and an edge offset mode selector 1030. Each of the 0-degree edge offset mode determinator 1022, the 45-degree edge offset mode determinator 1024, the 90-degree edge offset mode determinator 1026, and the 135-degree edge offset mode determinator 1028 calculates a correction value ev that gives the cost Cost (coding cost) defined by Equation 5 above and the minimum Cost.

FIG. 6 is an example of a functional block diagram of an edge offset mode determinator 106 in the comparison example.

The edge offset mode determinator 106 illustrated in FIG. 6 may either be the 0-degree edge offset mode determinator 1022, the 45-degree edge offset mode determinator 1024, the 90-degree edge offset mode determinator 1026, or the 135-degree edge offset mode determinator 1028.

The edge offset mode determinator 106 includes a decoded image EdgeIdx calculator 1062, a group categorizer 1064, correction value calculators 1066, 1068, 1070, 1072, and 1074 that correspond to EdgeIdx=0, 1, 2, 3, and 4, and an edge offset cost calculator 1076 that calculates a coding cost of Equation 2 corresponding to a correction value and EdgeIdx.

The decoded image EdgeIdx calculator 1062 calculates the EdgeIdx of a decoded image by using Equations 1 through 4 above.

The group categorizer 1064 refers to the EdgeIdx calculated by the decoded image EdgeIdx calculator 1062, and transmits information including a decoded image EdgeIdx to one of the correction value calculators 1066, 1068, 1070, 1072, and 1074.

FIG. 7 illustrates an example of a functional block diagram of a correction value calculator 108.

The correction value calculator 108 may either be the EdgeIdx=0 correction value calculator 1066, the EdgeIdx=1 correction value calculator 1068, the EdgeIdx=2 correction value calculator 1070, the EdgeIdx=3 correction value calculator 1072, or the EdgeIdx=4 correction value calculator 1074.

The correction value calculator 108 includes a statistical value calculator 1082 and a correction value determinator 1084. The correction value determinator 1084 further includes an error calculator 1086, a correction value candidate generator 1088, a code amount calculator 1090, and a correction value selector 1092.

At least one block, i.e., a portion of 64×63 pixels, for an original image and a decoded image that are related to each other is input to the statistical value calculator 1082. The statistical value calculator 1082 calculates a cumulative value N and a number of pixels D of differences between original images and decoded images.

Further, the statistical value calculator 1082 obtains average D/N of differences between original images and decoded images from cumulative value D of errors and the number of pixels N calculated by the statistical value calculator 1082.

The correction value candidate generator 1088 generates, as candidates for a correction value, integers D/N, D/N−1, D/N−2, . . . , 0 that are for example equal to or smaller than the average D/N of differences between original images and decoded images calculated by the statistical value calculator 1082. Candidates for a correction value do not need to be all of the integers that are equal to or smaller than the average D/N of the differences between original images and decoded images, but may be some of such integers.

The error calculator 1086 calculates square errors for a plurality of candidates for correction values obtained by the correction value candidate generator 1088. In this example, a square error is used as an error; however, other values may be used.

The code amount calculator 1090 calculates the code amount of candidates for correction values obtained by the correction value candidate generator 1088. In calculations of code amounts, it is possible to count the number of bits when a value of a candidate for a correction value is actually coded, or approximate values may be used.

The correction value selector 1092 uses a square error calculated by the error calculator 1086 and code amounts of candidates for correction values calculated by the code amount calculator 1090 so as to select a correction value (offset value). Specifically, it is also possible to determine as a correction value a candidate for a correction value that gives the minimum Cost for the Cost on the left side by assigning the square error to Distortion in Equation 5 and assigning the code amount of the correction value to Bit in Equation 5.

As described above, the correction value calculator 1066, the correction value calculator 1068, the correction value calculator 1070, the correction value calculator 1072, and the correction value calculator 1074 corresponding to EdgeIdx=0, 1, 2, 3, and 4 output correction values that correspond to respective EdgeIdx.

The edge offset cost calculator 1076 calculates the total of coding costs that were calculated by the correction value calculators 1066, 1068, 1070, 1072, and 1074 corresponding to EdgeIdx=0, 1, 2, 3, and 4, and if necessary further adjusts the cost so as to treat the result as edge offset cost.

The edge offset mode selector 1030 selects the mode that gives the minimum cost from among the 0-degree edge offset mode, the 45-degree edge offset mode, the 90-degree edge offset mode, and the 135-degree edge offset mode on the basis of the 0-degree edge offset mode determinator 1022, the 45-degree edge offset mode determinator 1024, the 90-degree edge offset mode determinator 1026, and the 135-degree edge offset mode determinator 1028 so as to set the selected mode as the mode for the SAO.

The mode of the edge offset selected by the SAO mode determinator 102 and the correction values are input to the corrector 104 and a final decoded pixel is generated by adding the correction values in a similar manner to the decoder.

FIG. 8 illustrates an example of categorization of edge shapes of original images and decoded pixels.

It is understood that there are two cases in which an edge is generated in a decoded pixel: a case where an original image has an edge shape and a case where an original image does not have an edge shape. In this example, it is not possible to determine whether the edges were caused by coding errors or whether the edges are a reflection of edges that had existed in the original image from the beginning.

Figure 9:
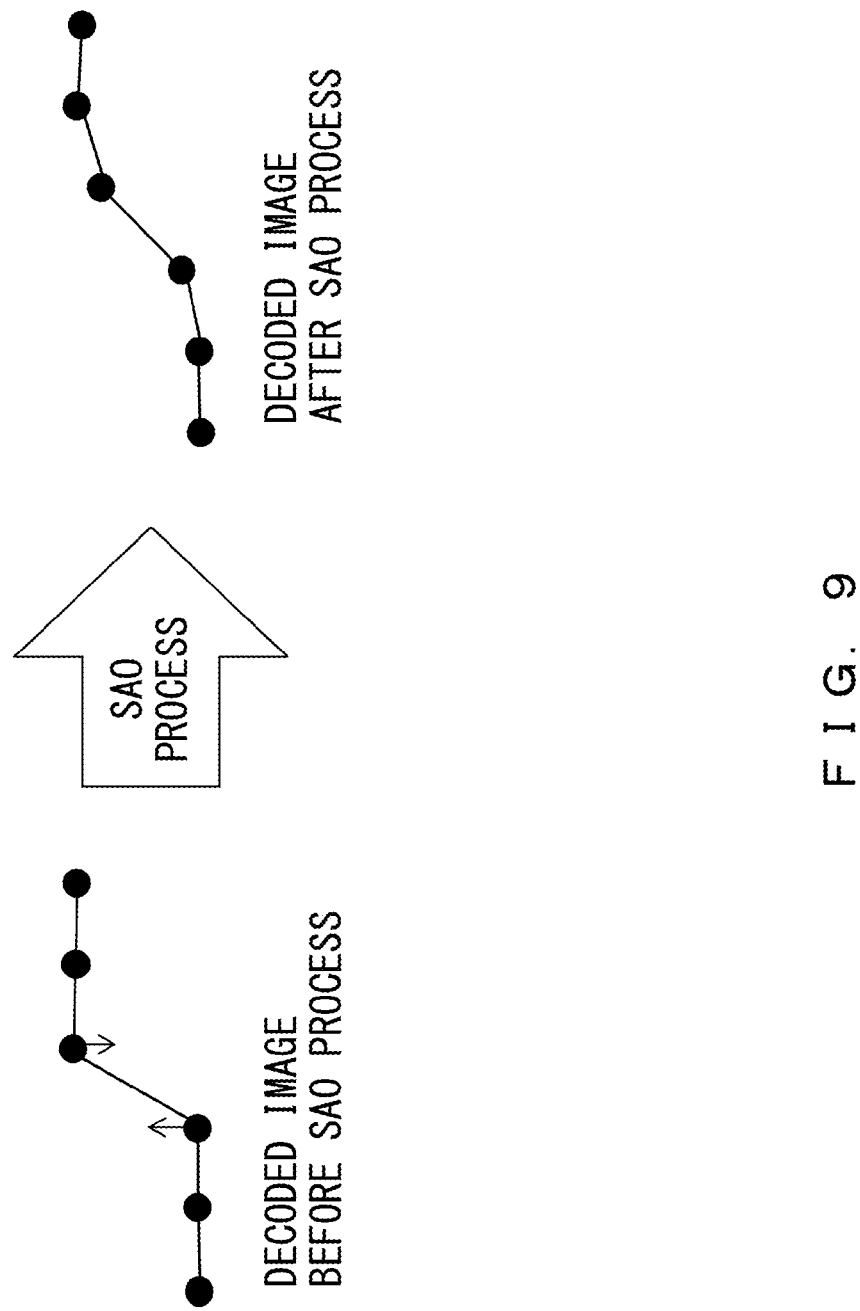
FIG. 9 illustrates an example of a case where an edge is blurred by the SAO process.
Figure 10:
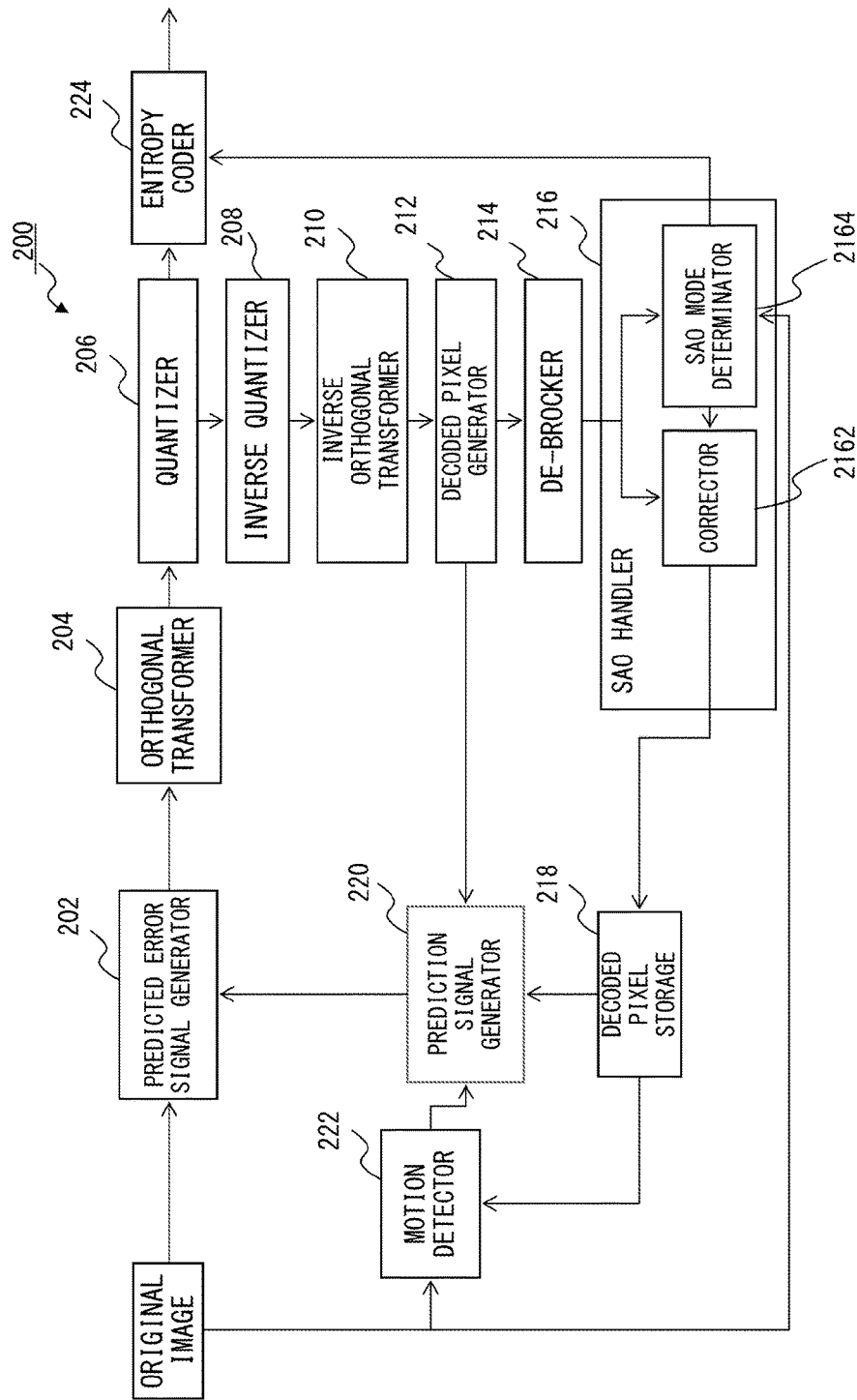
FIG. 10 illustrates an example of a functional block diagram of a video coding device.

FIG. 9 illustrates an example of a case where an edge is blurred by the SAO process.

Edges caused by coding errors do not cause problems even when they are smoothed because they are noise, which is reduced. However, edges that result from reflection of edges existing in original images are blurred when they are smoothed. Because a correction amount is determined on the basis of edges of decoded pixels for each group in the SAO process, a large scale amendment is made on the same type of edges so that edges in original images are bent, leading to the blurring of the edges when there is much noise.

<Video Coding Device>

In a video coding device disclosed below, higher priority is given to the reduction of a coding error of an edge existing in both an original image and a decoded pixel so as to suppress the blurring of an edge existing in a decoded pixel. For this purpose, the video coding device performs categorization into groups on the basis of edge shapes of decoded pixels, thereafter compares edge shapes of an original image and edge shapes of decoded pixels, and further performs categorization into at least two groups on the basis of whether or not the edge shapes have the same edge directions as illustrated in FIG. 8. The group of the same edge directions is categorized as first group E0 (also referred to as edge group) while the group of different edge directions is categorized as second group E1 (also referred to as noise group). In the video coding device disclosed below, correction values are calculated so that coding errors regarding first group E0 are reduced.

For example, in the video coding device disclosed below, statistical values are calculated independently for first group E0 and second group E1, and the coding error of first group E0 and the coding error of second group E1 when a certain correction value has been selected are calculated. Weighting coding errors are calculated on the basis of the respective coding errors. Next, by using the weighting coding errors and code amounts, costs (coding costs) expressed by Equation 2 are calculated and the correction value that results in a minimum cost Cost is selected. For example, when the correction value that minimizes the cost Cost expressed by Equation 2 is to be determined, the coding error of the first group E0 can be reduced by making the weight of the coding error of the first group E0 greater than that of the second group E1.

For calculating the cost Cost, costs for a plurality of candidates for correction values are calculated. At least one of the values of candidates for correction values is calculated on the basis of the statistical value of first group E0 and the statistical value of second group E1.

As a method of comparing edge shapes, the same method as the calculation method of EdgeIdx may be used and a different method may also be used.

Hereinafter, a video coding device 200 according to an embodiment will be explained by referring to the drawings.

FIG. 9 illustrates an example of a functional block diagram of the video coding device 200.

The video coding device 200 includes a predicted error signal generator 202, an orthogonal transformer 204, a quantizer 206, an inverse quantizer 208, an inverse orthogonal transformer 210, a decoded pixel generator 212, a de-blocking unit 214, an SAO handler 216, a decoded pixel storage unit 218, a prediction signal generator 220, a motion detection unit 222, and an entropy coder 224.

The decoded pixel storage unit 218 stores an image that received the coding process in the past and received a local decoding process in the video coding device in order to use the image as a reference picture for motion compensation.

The motion detection unit 222 detects a motion vector of an original image and a decoded image.

The prediction signal generator 220 generates a predicted pixel signal from a signal related to a motion vector detected by the motion detection unit 222 and a locally decoded image generated by the decoded pixel generator 212.

In order to perform motion compensation with respect to the original image, the predicted error signal generator 202 generates a predicted error signal from the difference between the pixel signal related to the original image and the predicted pixel signal generated by the prediction signal generator 220.

The orthogonal transformer 204 performs orthogonal transform on the predicted error signal obtained by the predicted error signal generator 202 so as to calculate the orthogonal transform coefficient.

The quantizer 206 performs quantization on the orthogonal transform coefficient obtained by the orthogonal transformer 204.

The inverse quantizer 208 performs inverse quantization on the orthogonal transform coefficient quantized by the quantizer 206.

The inverse orthogonal transformer 210 performs an inverse orthogonal transform process on the orthogonal transform coefficient that was inversely quantized by the inverse quantizer 208, and generates a decoded pixel signal.

The decoded pixel generator 212 generates a locally decoded image from a decoded pixel signal generated by the inverse orthogonal transformer 210. A signal related to the locally decoded image generated by the decoded pixel generator 212 is transmitted to the prediction signal generator 220.

The de-blocking unit 214 performs a filter process of reducing block noise from the signal related to the locally decoded image generated by the decoded pixel generator 212.

The SAO handler 216 includes an SAO mode determinator 2164 and a corrector 2162 similarly to the above SAO handler 100.

The SAO mode determinator 2164 employs a configuration or similar identical to that of the SAO mode determinator 100 illustrated in FIG. 5. In other words, the SAO mode determinator 102 further includes the 0-degree edge offset mode determinator 1022, the 45-degree edge offset mode determinator 1024, the 90-degree edge offset mode determinator 1026, the 135-degree edge offset mode determinator 1028, and the edge offset mode selector 1030. Each of the 0-degree edge offset mode determinator 1022, the 45-degree edge offset mode determinator 1024, the 90-degree edge offset mode determinator 1026, and the 135-degree edge offset mode determinator 1028 calculates a correction value for each group corresponding to a coding cost defined by Equation 5 above and each mode.

Figure 11:
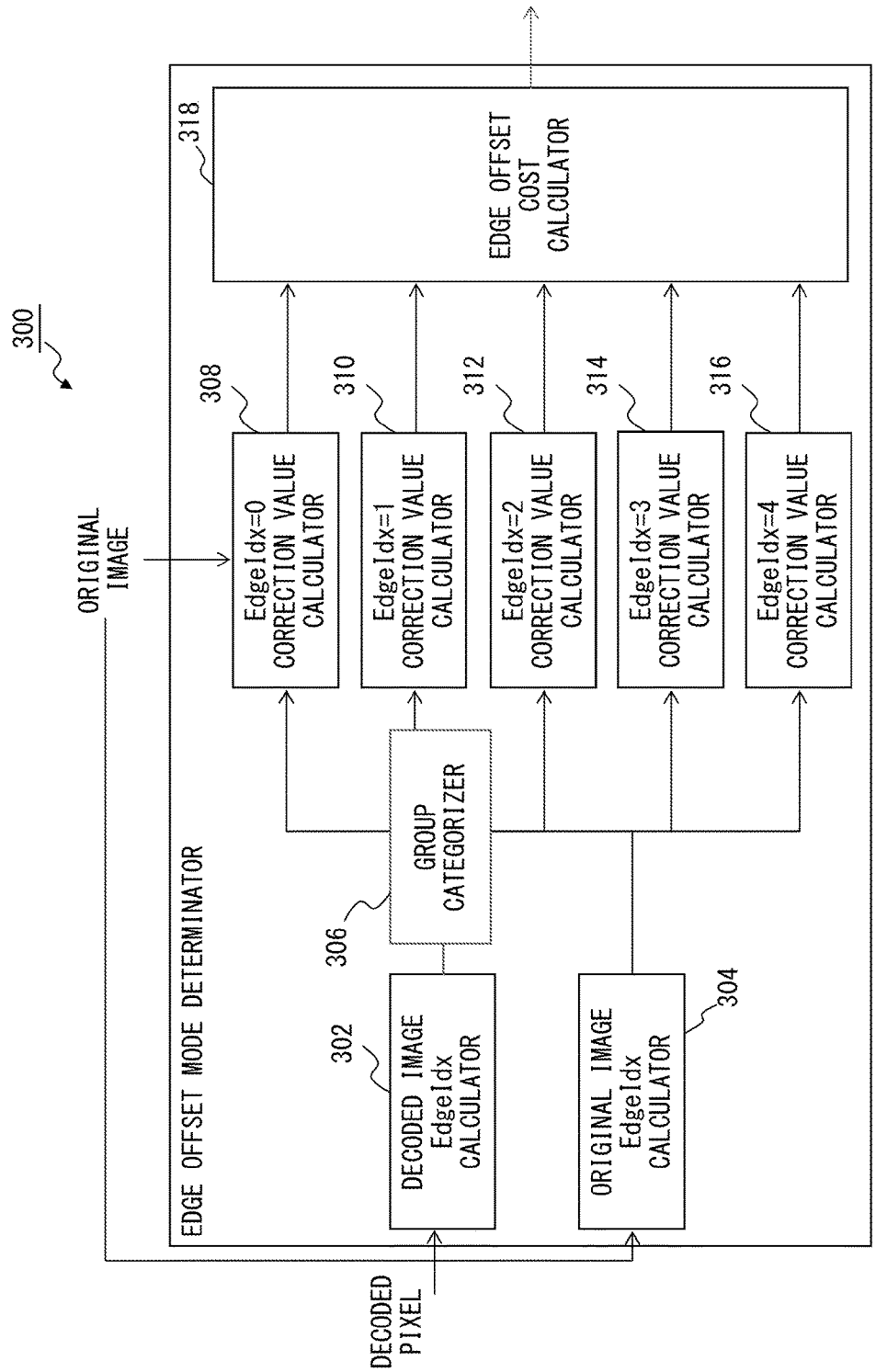
FIG. 11 illustrates an example of a functional block diagram of an edge offset mode determinator.

FIG. 11 illustrates an example of a functional block diagram of an edge offset mode determinator 300. The edge offset mode determinator 300 illustrated in FIG. 11 may either be the 0-degree edge offset mode determinator 1022, the 45-degree edge offset mode determinator 1024, the 90-degree edge offset mode determinator 1026, or the 135-degree edge offset mode determinator 1028.

The edge offset mode determinator 300 includes a decoded image EdgeIdx calculator 302, an original image EdgeIdx calculator 304, a group categorizer 306, correction value calculators 308, 310, 312, 314, and 316 corresponding to EdgeIdx=0, 1, 2, 3, and 4, and an edge offset cost calculator 318.

The decoded image index (EdgeIdx) calculator 302 calculates a decoded image edge index, which is the EdgeIdx of a decoded image representing the edge shape of a decoded image, by using the above Equations 1 through 4.

The original image EdgeIdx calculator 304 also calculates an original image edge index representing the edge shape of the original image corresponding to the decoded image, i.e., the EdgeIdx of the original image, by using Equations 1 through 4 above similarly to the calculation of the EdgeIdx of the decoded pixel. As a matter of course, a different method may be used; however, it is assumed in this example that the shape of the edge of the original image is calculated as the EdgeIdx of the original image as in Equation 1 similarly to the calculation of the EdgeIdx of a decoded pixel.

In the group categorizer 306, by referring to the EdgeIdx of the decoded image and the original image calculated by the decoded image EdgeIdx calculator 302 and the original image EdgeIdx calculator 304, information containing the decoded image and the EdgeIdx of the decoded image or information containing the original image and the EdgeIdx of the original image is transmitted to one of the correction value calculators 308, 310, 312, 314, and 316 corresponding to EdgeIdx=0, 1, 2, 3, and 4.

Figure 12:
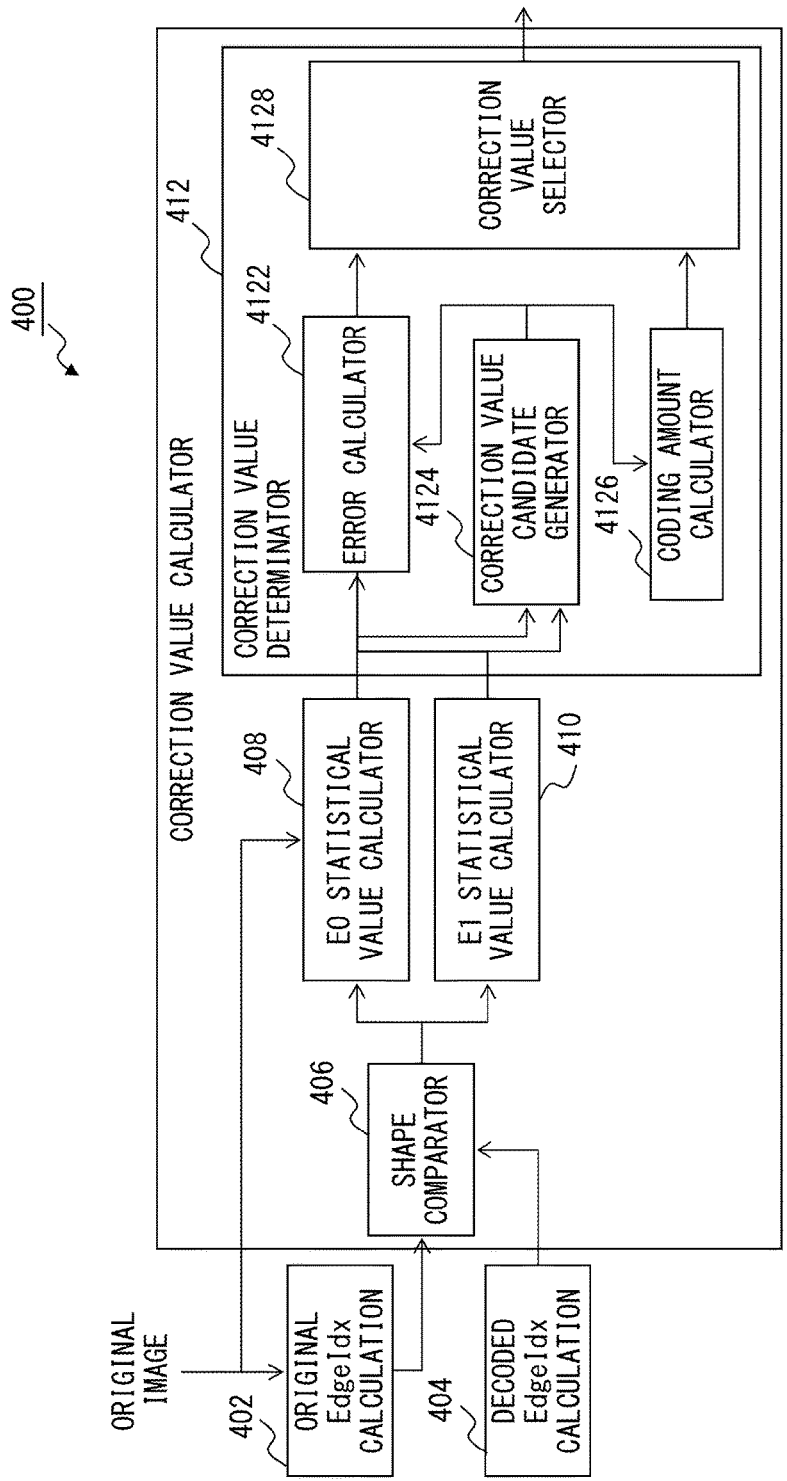
FIG. 12 illustrates an example of a functional block diagram of a correction value calculator.

FIG. 12 illustrates an example of a functional block diagram of a correction value calculator 400.

The correction value calculator 400 may either be the correction value calculator 308, the correction value calculator 310, the correction value calculator 312, the correction value calculator 314, or the correction value calculator 316.

The correction value calculator 400 includes a shape comparator 406, an E0 statistical value calculator 408, an E1 statistical value calculator 410, an error calculator 4122, a correction value candidate generator 4124, a code amount calculator 4126, and a correction value selector 4128. The error calculator 4122, the correction value candidate generator 4124, the code amount calculator 4126, and the correction value selector 4128 are combined to form a correction value determinator 412.

The shape comparator 406 compares the edge shape of an original image and the edge shape of a decoded pixel and further categorizes edge shapes into at least two groups as illustrated in FIG. 8 on the basis of whether or not the pixels have the same edge directions. The group with the same edge directions is categorized as first group E0 (also referred to as an edge group) while the group with different edge directions is categorized as second group E1 (also referred to as a noise group). In other words, the shape comparator 406 compares a decoded image edge index and an original image edge index so as to perform categorization into a plurality of types, and categorizes the edge shapes of decoded images into an edge group in which the edge direction of the original image and edge directions of decoded images are the same and into a noise group in which the edge direction of the original image and edge directions of decoded images are different.

For example, in the shape comparator 406, when the EdgeIdx of a decoded pixel is one or two, it is recognized that the shapes are identical. When the EdgeIdx of an original image is zero, three, or four, it is recognized that the shapes are not identical. When the EdgeIdx is three or four, they are recognized as being identical when the EdgeIdx of the original image is also three or four, while when the EdgeIdx of the original image is zero, one, or two, they are recognized as not being identical. It is also possible to determine that the shapes are identical only when the EdgeIdx of a decoded image and the EdgeIdx of the original image are completely identical and to determine that they are not identical in the other cases.

At least part of one block, i.e., 64×64 pixels of an original image and a decoded image that are in the corresponding groups and that are related to each other, is input to the E0 statistical value calculator 408 and the E1 statistical value calculator 410. The E0 statistical value calculator 408 and the E1 statistical value calculator 410 calculate cumulative value Dsum and the number of pixels Nd of the difference between the original image and the decoded image in the corresponding groups. The cumulative values of difference values and the numbers of pixels respectively corresponding to first group E0 (edge group) and second group E1 (noise group) are assumed to be Dsum (E0), Dsum (E1), Nd (E0), and Nd (E1), respectively. Information related to cumulative values Dsum (E0) and Dsum (E1) and numbers of pixels Nd (E0) and Nd (E1) is referred to as statistical information. The statistical calculator calculates statistical amounts, e.g., Dsum (E0), Dsum (E1), Nd (E0), and Nd (E1) related to the edge shape of the original image and the edge shape of the decoded image for the edge group and the noise group, respectively.

The correction value determinator 412 determines correction values ev for the decoded images respectively corresponding to the edge group and the noise group on the basis of the statistical amounts Dsum (E0), Dsum (E1), Nd (E0), and Nd (E1) for a plurality of groups.

The correction value candidate generator 4124 generates candidates for correction values on the basis of the pieces of statistical information respectively for first group E0 (edge group) and second group E1 (noise group). For example, the correction value candidate generator 4124 may use Equation 6, where w0 and w1 are weight parameters, so as to treat A, A−1, A−2, . . . , 0 as candidates for correction values by using "A" as a reference. It is also possible to appropriately narrow candidates from these candidate values. For example, it is also possible to treat "A" alone as a candidate. It is also possible to assume that w1 is an arbitrary value from zero through one based on an assumption that for example w0=2−w1. In particular, it is desirable that w1 be assumed to be around 0.5 through 1.

$$A = \frac{w0 \times Dsum(E0) + w1 \times Dsum(E1)}{Nd(E0) + Nd(E1)} \quad (6)$$

The error calculator 4122 calculates the square error for a plurality of candidates for correction values obtained by the correction value candidate generator 4124. In this example, a square error is used as an error; however, other values may be used.

When for example a value as a correction value candidate is assumed to be e, the error calculator 4122 may calculate a weighting square error on the basis of the equation below.

$$\text{Err}(e) = \alpha 0 \times e \times (Nd(E0)e - 2Dsum(E0)) + \alpha 1 \times e \times (Nd(E1)e - 2Dsum(E1)) \quad (7)$$

In the equation above, α0 and α1 satisfy α0=(2−α1) and α1 may be an arbitrary value of zero through one. In particular, it is desirable that α1 be around 0.5 through one. The value of w1 or α1 may be changed in units of blocks or of pictures. For example, a method by which the flatness of blocks are evaluated so as to change values in accordance with the flatness or a method by which values are changed in accordance with coding types such as an I picture, P picture, or B picture may be used.

The code amount calculator 4126 calculates the code amount of value e as a candidate for a correction value obtained by the correction value candidate generator 4124. For the calculation of code amounts, the number of bits may be counted for a case when value e as a candidate for a correction value is actually coded, or an approximate value may be used. The code amount of value e as a candidate for a correction value is sometimes referred to as Bit (e).

The code amount calculator 4126 may use a coding method that uses arithmetic signs, which is referred to as CABAC. In such a case, the value of a correction value is converted into a binary string. A method of converting the value into a binary string is for example Truncated Unary Binarization. In other words, when the absolute value of a correction value is zero, it is converted into zero, and when the absolute value of a correction value is 1, it is converted into 10, while when the absolute value of a correction value is 2, it is converted into 110. Also, the positive or negative sign of a correction value is determined by EdgeIdx automatically, and accordingly coding is not necessary. Also, when the pixel value is eight bits, the absolute value of a correction value is limited to an integer from zero through seven in HEVC. By converting this binary string into arithmetic signs, a high compression efficiency can be attained. An estimated code amount may be the bit length of a binary string before performing the conversion into arithmetic signs or may be the bit length after the conversion into arithmetic signs.

The correction value selector 4128 calculates a cost by using a square error Err(e) calculated by the error calculator 4122 and a code amount Bit(e) as a candidate for a correction value calculated by the code amount calculator 4126 for Equation 5, and selects, as a correction value (offset value) ev, the correction value candidate that leads to the smallest cost (coding cost). The correction value selector 416 outputs correction value ev and cost Cost. Also, regarding a cost to be output, it is also possible to calculate the square error without weights assuming that α0=1 and α1=1 in Equation 7 by using correction value ev to be output, to again calculate the cost by using the obtained Err, and to output that cost.

As described above, the correction value calculators 308, 310, 312, 314, and 316 corresponding to EdgeIdx=0, 1, 2, 3, and 4 output correction values ev and costs Cost corresponding respective EdgeIdx's.

The edge offset cost calculator 318 calculates the total coding cost defined as the sum of the coding costs calculated by the correction value calculators 308, 310, 312, 314, and 316 corresponding to EdgeIdx=0, 1, 2, 3, and 4, and further adjusts the costs if necessary, and treats the costs as the edge offset costs of a corresponding EdgeIdx. Thereafter, the edge offset cost calculator 318 outputs the total coding cost and the correction values of respective EdgeIdx's to the edge offset mode selector 1030.

The edge offset mode selector 1030 selects a mode that results in a minimum cost from among the total coding costs received from the respective edge offset mode determinators 1022, 1022, 1024, 1026, and 1028 and the correction values of respective EdgeIdx's, and outputs the selected mode and respective correction values ev to the corrector 2162.

The SAO handler 216 performs a process of adding a correction value to a decoded pixel, and outputs the result to the decoded pixel storage 218 and the entropy coder 224.

The entropy coder 224 performs entropy coding on input information, and outputs the coding stream.

By using a video coding device having the above configuration, the edges of original images can be stored in the Sample Adaptive Offset (SAO) process, making it possible to suppress the occurrence of blurring due to the SAO process. In other words, in the above video coding device, the SAO is categorized by HEVC into the edge group in which the edge direction of an original image and the edge direction of a decoded image are the same and the noise group in which the edge direction of an original image and the edge direction of a decoded image are different so as to give a higher priority to an increase in the correction amount (offset value) for the noise group, and thereby an offset value is calculated in such a manner that the edge of the original image is stored when the SAO process is performed in HEVC. This process makes it possible to store the edge of an original image and to suppress the occurrence of blurring.

Figure 13:
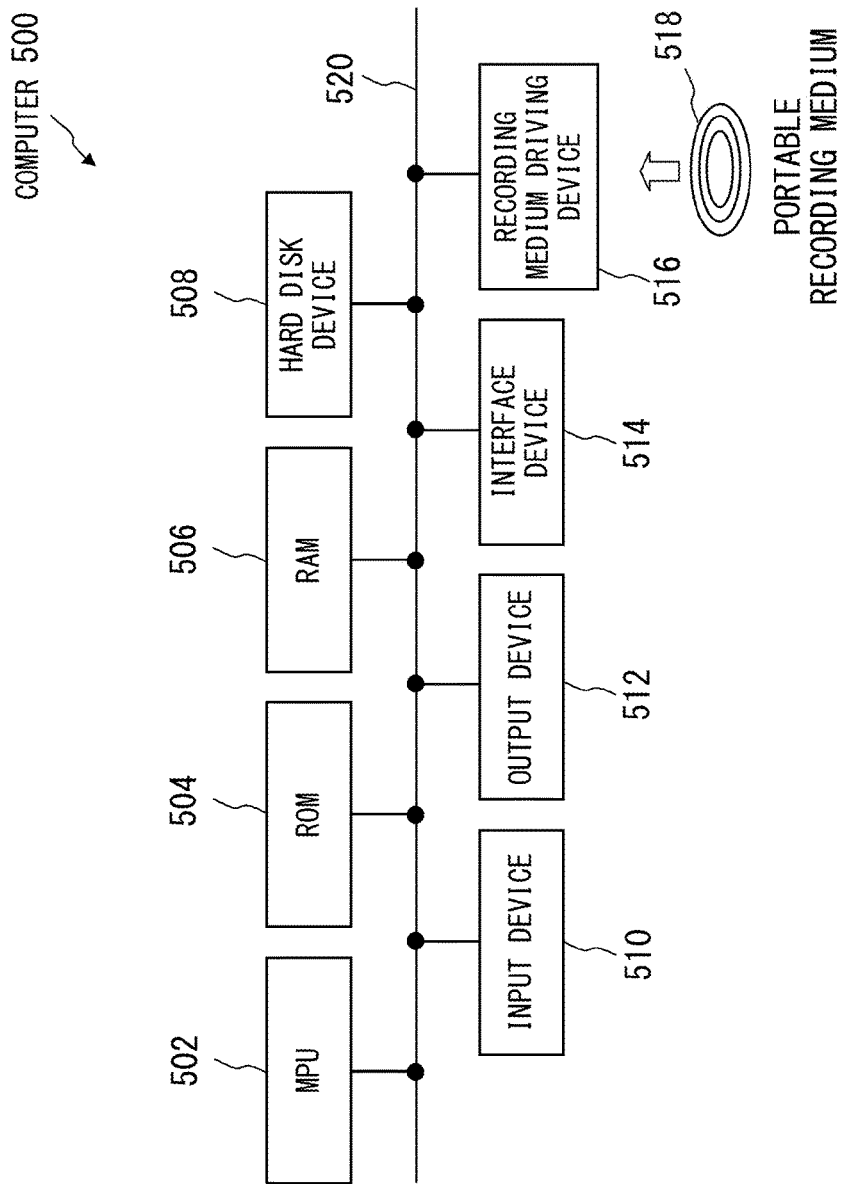
FIG. 13 illustrates an example of a configuration of the video coding device.

FIG. 13 illustrates an example of a configuration of the video coding device 200 according to an embodiment. The video coding device 200 may be implemented as a general-purpose computer 500.

This computer 500 includes a micro processing unit (MPU) (processor) 502, a read only memory (ROM) 504, a random access memory (RAM) 506, a hard disk device 508, an input device 510, a display device 512, an interface device 514, and a recording medium driving device 516. These constituents are connected via a bus line 520, and can transmit various data to and receive various data from each other under control of the MPU 502.

The MPU 502 is an arithmetic processing unit that controls the entire operation of this computer 300, and functions as a control processing unit of the computer 500.

The ROM 504 is a read-only semiconductor memory in which a prescribed basic control program is stored beforehand. The MPU 502 reads and executes this basic control program when the computer 300 is activated so that operations of respective constituents of the computer 300 can be controlled.

The RAM 506 is a semiconductor memory that is writable and readably on an as-needed basis and that is used as a working storage area if necessary when the MPU 502 executes various video coding programs.

The hard disk device 508 is a storage device in which various control programs executed by the MPU 502 and various types of data are stored. The MPU 502 reads and executes a prescribed control program stored in the hard disk device 508 so that the various control processes, which will be described later, can be performed.

The input device 510 is for example a mouse or a keyboard, and when it is manipulated by a user of the video coding device 200, it obtains inputs of various pieces of information associated with the manipulation contents so as to transmit the obtained input information to the MPU 502.

The display device 512 is for example a liquid crystal display device, and it displays various types of text or images in accordance with display data transmitted from the MPU 502.

The interface device 514 manages transmission and reception of various pieces of information between various devices connected to this computer 500.

The recording medium driving device 516 is a device that reads various control programs or data recorded in a portable recording medium 518. The MPU 502 can also perform various control processes, which will be described later, by reading via the recording medium driving device 516 and executing a prescribed control program recorded in the portable recording medium 518. Examples of the portable recording medium 518 are a flash memory having a connector compatible with the Universal Serial Bus (USB) protocol, a Compact Disc Read Only Memory (CD-ROM), a Digital Versatile Disc Read Only Memory (DVD-ROM), etc.

In order to configure the video coding device 200 by using this computer 500, a control program for making the MPU 502 execute for example the processes in the respective processing units is generated. The generated control program is stored beforehand in the hard disk device 508 or the portable recording medium 518. Thereafter, a prescribed instruction is given to the MPU 502 so as to make the MPU 502 read and execute this control program. Thereby, the functions included in the video coding device 200 are provided by the MPU 502.

<Processes of Video Coding>

By referring to FIG. 14 and FIG. 15, an example of processes of video coding (video coding processes) will be explained.

Also, when the video coding device 200 is provided in the form of the general-purpose computer 500 as illustrated in FIG. 13, the explanations below define a control program (a program for causing a computer to execute one of the video coding processes) that executes such processes. In other words, the explanations below are also explanations of a control program that makes a general-purpose computer execute the processes explained below.

When the process has been started, the motion detector 222 of the video coding device 200 receives in S100 an original image input to the video coding device 200. Then, the motion detector 222 obtains pixel data of a reference picture from the decoded pixel storage 218, detects regions on the reference image that correspond to respective blocks in the original image, and obtains the motion vector of the position. The motion detector 222 outputs the motion vector and region position information of the reference image referred to by the motion vector to the prediction signal generator 220 and the entropy coder 224. When the process of this step is terminated, the process proceeds to S102.

In S102, the prediction signal generator 220 of the video coding device 200 obtains pixel data of the reference picture from the decoded pixel storage 218 on the basis of the region position information of the input reference image, and generates a prediction signal. When the process in this step is terminated, the process proceeds to S104.

In S104, the predicted error signal generator 202 of the video coding device 200 receives an original image and a predicted pixel signal, and generates a predicted error signal by calculating the difference between the original image and the prediction signal. When the process in this step is terminated, the process proceeds to S106.

In S106, the orthogonal transformer 204 of the video coding device 200 first performs an orthogonal transform process such as discrete cosine transform or discrete sine transform on the predicted error signal generated in S104 so as to obtain an orthogonal transform coefficient. Next, the quantizer 206 of the video coding device 200 inputs the orthogonal transform coefficient to the quantizer so that the coefficient is quantized. The quantized orthogonal transform coefficient is output to the entropy coder 224. When the process in this step is terminated, the process proceeds to S108 and S118.

In S108, the inverse quantizer 208 of the video coding device 200 first inversely quantizes the quantized orthogonal transform coefficient obtained in S106. Further, the inverse orthogonal transformer 210 of the video coding device 200 performs inverse orthogonal transform on the orthogonal transform coefficient that was quantized inversely, and outputs information related to the obtained image to the decoded pixel generator 212. When the process in this step is terminated, the process proceeds to S110.

In S110, the decoded pixel generator 210 of the video coding device 200 adds the predicted error signal to the signal generated in S108 so as to generate a decoded pixel. When the process in this step is terminated, the process proceeds to S112.

In S112, the de-blocker 214 of the video coding device 200 performs a de-block filter process on the decoded pixel generated in S110 and performs a smoothing process on a block boundary. When the process in this step is terminated, the process proceeds to S114.

In S114, the SAO handler 216 of the video coding device 200 performs the SAO process on the decoded pixel that received the smoothing process in S112.

The SAO process performed by the SAO handler 216 will be explained by referring to FIG. 15.

Figure 15:
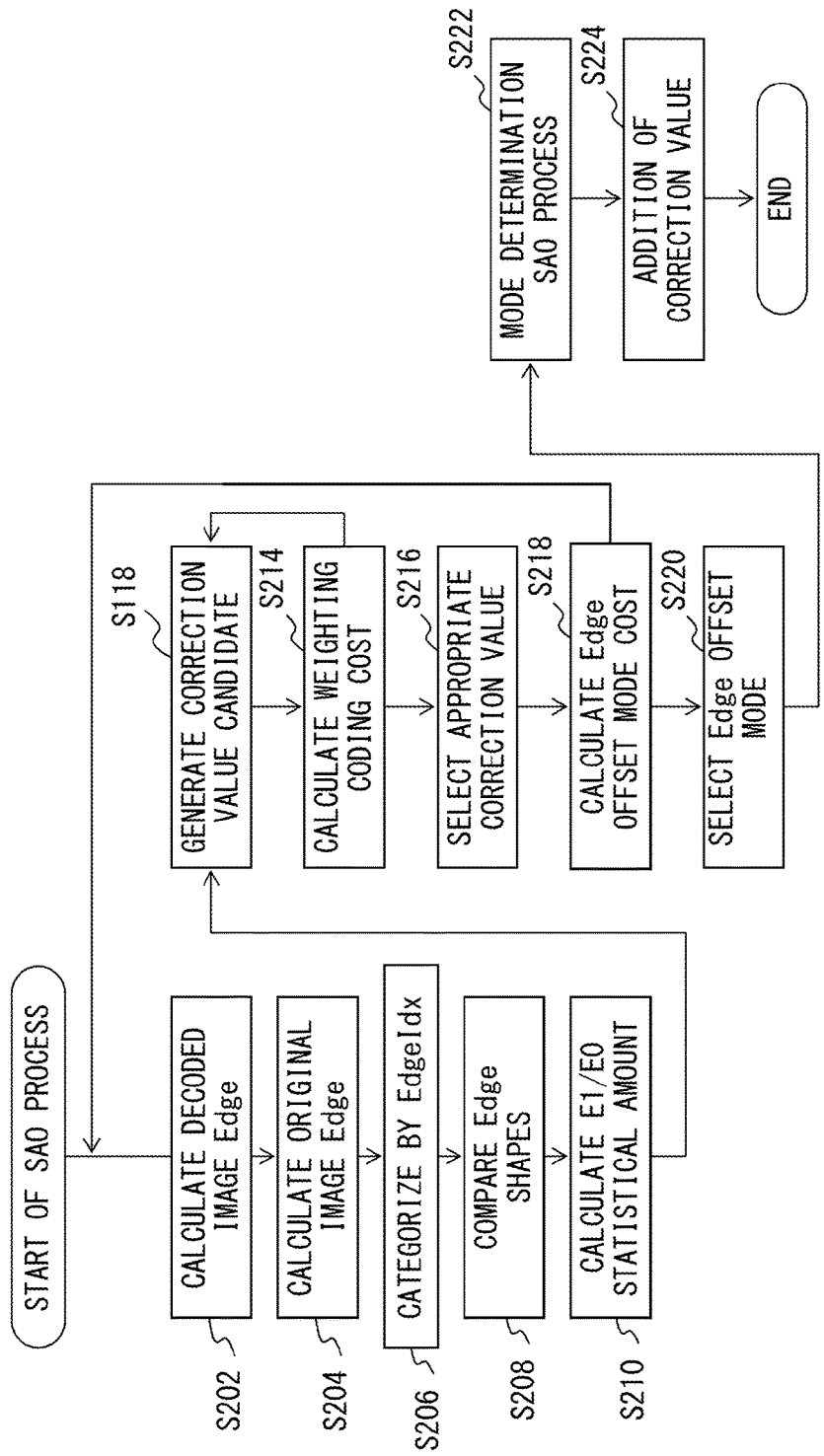
FIG. 15 illustrates an example of a flow of processes in the SAO process.

FIG. 15 illustrates an example of a flow of processes in the SAO process.

In S202, the decoded image EdgeIdx calculator 302 of the edge offset mode determinator 300 calculates the EdgeIdx of a decoded image by using Equations 1 through 4. When the process in this step is terminated, the process proceeds to S204.

The edge offset mode determinator 300 may either be the 0-degree edge offset mode determinator 1022, the 45-degree edge offset mode determinator 1024, the 90-degree edge offset mode determinator 1026, or the 135-degree edge offset mode determinator 1028.

In S204, the original image EdgeIdx calculator 304 of the edge offset mode determinator 300 calculates the EdgeIdx of the original image by using Equations 1 through 4 similarly to the calculation of the EdgeIdx of the decoded pixel. When the process in this step is terminated, the process proceeds to S206.

In S206, the group categorizer 306 of the edge offset mode determinator 300 refers to the decoded image and the EdgeIdx of the original image calculated by the decoded image EdgeIdx calculator 302 and the original image EdgeIdx calculator 304 so as to transmit information including the decoded image and the EdgeIdx of the decoded image or information including the original image and the EdgeIdx of the original image to one of the correction value calculators 308, 310, 312, 314, and 316 corresponding to EdgeIdx=0, 1, 2, 3, and 4. When the process in this step is terminated, the process proceeds to S208.

In S208, the shape comparator 402 of the correction value calculator 400 compares the edge shape of the original image and the edge shape of the decoded pixel and performs categorization into at least two groups as illustrated in FIG. 8 on the basis of whether the compared edges are in the same direction. The group of the same edge direction is referred to as group E0 (also referred to as an edge group) and the group of different edge directions is referred to as group E1 (also referred to as a noise group). When the process in this step is terminated, the process proceeds to S210.

The correction value calculator 400 may either be the EdgeIdx=0 correction value calculator 308, the EdgeIdx=1 correction value calculator 310, the EdgeIdx=2 correction value calculator 312, the EdgeIdx=3 correction value calculator 314, or the EdgeIdx=4 correction value calculator 316.

In S210, the E0 statistical value calculator 408 or the E1 statistical value calculator 410 of the correction value calculator 400 calculates cumulative value Dsum and the number of pixels Nd of the difference between the original image and the decoded image for at least part of one block i.e., 64×64 pixels of the original image and the decoded image that are in the corresponding groups and that are related to each other. The cumulative values of difference values and the numbers of pixels respectively corresponding to first group E0 (edge group) and second group E1 (noise group) are assumed to be Dsum (E0), Dsum (E1), Nd (E0), and Nd (E1), respectively. Information related to cumulative values Dsum (E0) and Dsum (E1), and numbers of pixels Nd (E0) and Nd (E1) is referred to as statistical information. When the process in this step is terminated, the process proceeds to S212.

In S212, the correction value candidate generator 4124 of the correction value calculator 400 generates candidates for correction values on the basis of the pieces of statistical information respectively for first group E0 (edge group) and second group E1 (noise group). For example, the correction value candidate generator 4124 may use the equation below, where w0 and w1 are weight parameters, so as to treat A, A−1, A−2, . . . , 0 as candidates for correction values by using "A" as a reference. When the process in this step is terminated, the process proceeds to S214.

$$A = \frac{w0 \times Dsum(E0) + w1 \times Dsum(E1)}{Nd(E0) + Nd(E1)} \quad (8)$$

In S214, the error calculator 4122 of the correction value calculator 400 first calculates square errors for a plurality of candidates for correction values obtained by the correction value candidate generator 4124. In this example, square errors are used as errors; however, other values may be used.

When for example a value as a correction value candidate is assumed to be e, the error calculator 4122 may calculate a weighting square error on the basis of the equation below.

$$\mathrm{Err}(e) = \alpha 0 \times e \times (Nd(E0)e - 2D\mathrm{sum}(E0)) + \alpha 1 \times e \times (Nd(E1)e - 2D\mathrm{sum}(E1)) \quad (9)$$

In the above equation, $\alpha 0$ and $\alpha 1$ are assumed to satisfy $\alpha 0 = (2 - \alpha 1)$ and $\alpha 1$ may be an arbitrary value of zero through one.

In S214, the code amount calculator 4126 of the correction value calculator 400 further calculates the code amount of value e as a candidate for a correction value obtained in S212. In the calculations of code amounts, it is possible to count the number of bits when a value of a candidate for a correction value is actually coded, or approximate values may be used. The code amount of value e as a candidate for a correction value is sometimes referred to as Bit (e). When the process in this step is terminated, the process proceeds to S216.

In S216, the correction value selector 4128 of the correction value calculator 400 calculates a cost by using square error Err (e) calculated in S214 and code amount Bit (e) as a candidate for a correction value for Equation 5, and selects, as a correction value (offset value) ev, the correction value candidate that leads to the smallest cost (coding cost). In this step, thusly selected correction value ev and cost Cost corresponding to respective EdgeIdx are output. When the process in this step is terminated, the process proceeds to S218.

In S218, the edge offset cost calculator 318 of the edge offset mode determinator 300 calculates the total coding cost, defined as the sum of the coding costs calculated by the correction value calculators 308, 310, 312, 314, and 316 corresponding to EdgeIdx=0, 1, 2, 3, and 4. It is also possible to further adjust the costs if necessary, to treat the costs as the edge offset costs of corresponding EdgeIdx, and output the total coding cost and correction values for respective EdgeIdx. When the process in this step is terminated, the process proceeds to S220.

In S220, the edge offset mode selector 1030 selects the mode that results in the minimum costs from among the total coding costs received from the respective edge offset mode determinators 1022, 1024, 1026, and 1028 and correction values of respective EdgeIdx, and outputs the selected mode and respective correction values ev to the corrector 2162. When the process in this step is terminated, the process proceeds to S222.

In S222, the SAO mode determinator 2164 of the SAO handler 216 selects a pixel of a decoded image that corresponds to the mode that was selected in S220 and that results in the minimum cost.

In S224, the SAO mode determinator 2164 of the SAO handler 216 performs a process of adding a correction value to the pixel value of the decoded pixel. When the process in this step is terminated, the process proceeds to S116 in FIG. 14.

Figure 14:
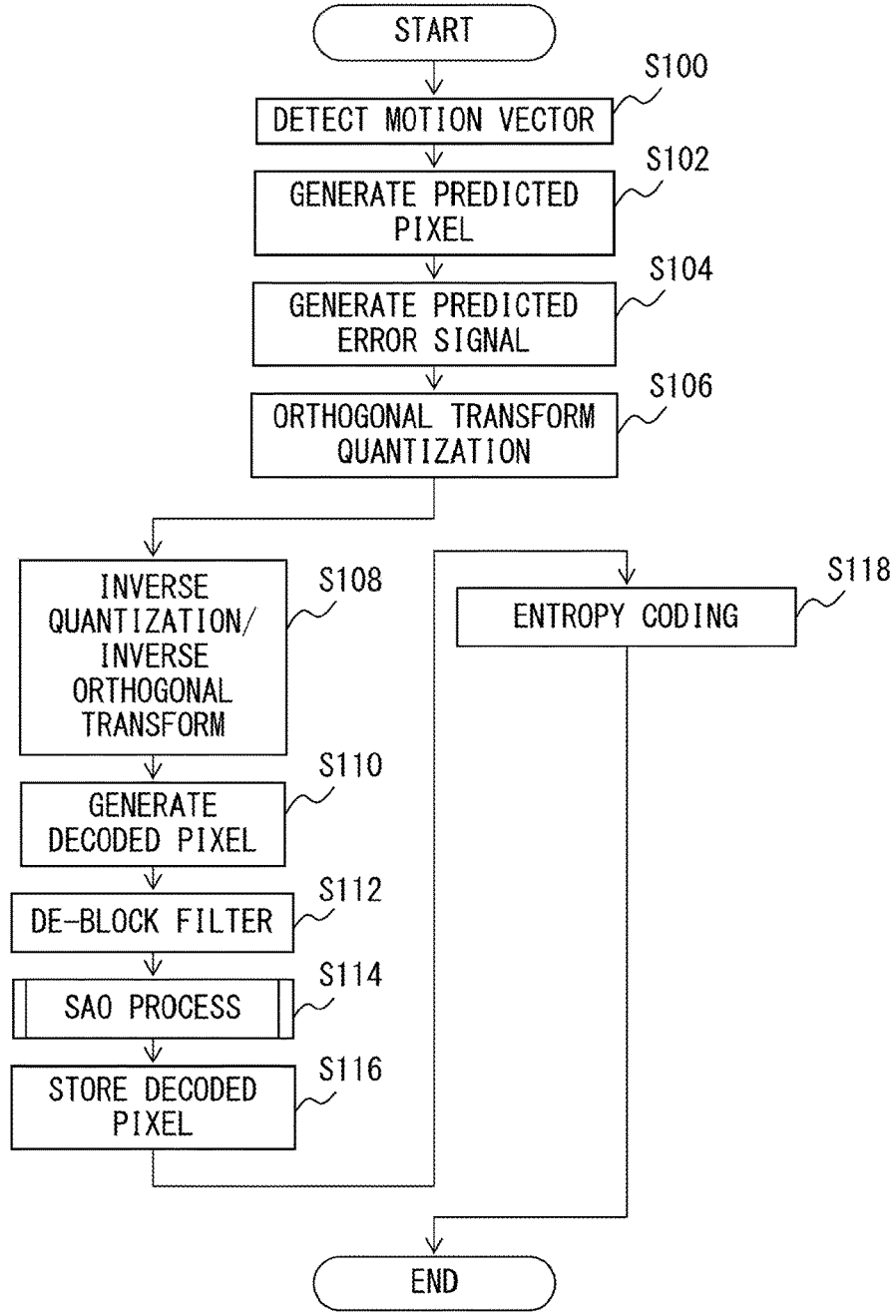
FIG. 14 illustrates an example of a flow of processes in a video coding process.

The decoded pixel storage unit 218 stores the obtained decoded pixel in the decoded pixel storage 218 in S116 in FIG. 14.

Also, in S118, the entropy coder 224 performs entropy coding on motion vector information and quantized orthogonal transform coefficient information, and outputs the results as stream data. In this step, entropy coding is performed; however, other coding schemes may be used. The entropy coder 224 may simply be referred to as the coder 224.

The order of S116 and S118 above may be reversed.

By using a video coding method as described above, edges of original images can be stored in a Sample Adaptive Offset (SAO) process by High Efficiency Video Coding (HEVC), making it possible to suppress the occurrence of blurring due to the SAO process.

In the filter process SAO applied to decoded images after the de-blocking filter process in HEVC as a video coding method, it is possible to suppress the occurrence of blurring in a decoded image by performing categorization into groups based on whether or not directions of edges of original images and those of decoded images are the same in addition to the conventional categorization into groups based on edge shapes of decoded images, and by giving a higher priority to the reduction in coding errors in the group in which the original images and decoded images have the same edge direction so as to smooth the edges by the SAO process. Although the expression "giving a higher priority to the reduction in coding errors in the group in which the original images and decoded images have the same edge direction" used herein may have some range of interpretation, it is probably possible to employ a configuration in which, when candidates for a correction value (offset value) are calculated by using a method of an undetermined coefficient, different weights are given to statistical amounts for the group in which an original image and a decoded image have edges in the same direction (E0 group or edge group) and the group in which an original image and a decoded image have edges in different directions, so that the correction value for an E1 group is smaller that that for an E0 group as an entire block.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video coding device that generates a predicted error signal from a comparison between a decoded image obtained by performing decoding after coding an original image and the original image and that codes the predicted error signal, the video coding device including a processor configured to execute a process comprising:

calculating a decoded image edge index that represents a type of an edge shape of the decoded image, calculating an original image edge index that represents a type of an edge shape of the original image before the coding, comparing the decoded image edge index and the original image edge index and categorizing the edge shape of the decoded image into an edge group in which an edge direction of the original image and an edge direction of the decoded image are the same or into a noise group in which an edge direction of the original image and an edge direction of the decoded image are different, calculating, as a coding error for the edge group, a cumulative value of coding errors for each of the decoded images with edge shapes categorized into the edge group, calculating, as a coding error for the noise group, a cumulative value of coding errors for each of the decoded images with edge shapes categorized into the noise group, determining a correction value based on the coding error for the edge group, a first weight given to the coding error for the edge group, the coding error for the noise group, and a second weight given to the coding error for the noise group, the first and second weights being set in such a manner that the coding error for the edge group contributes to the correction value more than does the coding error for the noise group, generating a corrected decoded image by adding the correction value to each pixel value of the decoded image, detecting a motion vector of the original image, performing generation of the predicted error signal from the motion vector and the corrected decoded image, and coding the predicted error signal.

2. The video coding device according to claim 1, wherein the determining of the correction value comprises:

generating candidates for the correction value, based on the coding error for the edge group, the first weight, the coding error for the noise group, and the second weight, calculating, for each of the candidates for the correction value, square errors which respectively correspond to the edge group and the noise group and each of which is for the decoded images and the original images, and selecting one candidate from the candidates for the correction value based on a weighting sum of the square error corresponding to the edge group and the square error corresponding to the noise group and thereby determining the correction value.

3. The video coding device according to claim 2, wherein the determining of the correction value further comprises:

calculating a code amount of the candidates for the correction values, and the one candidate is selected further based on the code amount.

4. The video coding device according to one of claim 2, wherein the candidates for the correction values are generated by using a sum of a value obtained by multiplying the first weight by the coding error for the edge group and a value obtained by multiplying the second weight by the coding error for the noise group.

5. A video coding method, processed by a processor, that generates a predicted error signal from a comparison between a decoded image obtained by performing decoding after coding an original image and the original image and that codes the predicted error signal, the video coding method comprising:

calculating a decoded image edge index that represents a type of an edge shape of the decoded image;

calculating an original image edge index that represents a type of an edge shape of the original image corresponding to the decoded image;

comparing the decoded image edge index and the original image edge index and categorizing the edge shape of the decoded image into an edge group in which an edge direction of the original image and an edge direction of the decoded image are the same or into a noise group in which an edge direction of the original image and an edge direction of the decoded image are different;

calculating as a coding error for the edge group, a cumulative value of coding errors for each of the decoded images with edge shapes categorized into the edge group;

calculating, as a coding error for the noise group, a cumulative value of coding errors for each of the decoded images with edge shapes categorized into the noise group;

determining a correction value based on the coding error for the edge group, a first weight given to the coding error for the edge group, the coding error for the noise group, and a second weight given to the coding error for the noise group, the first and second weights being set in such a manner that the coding error for the edge group contributes to the correction value more than does the coding error for the noise group;

generating a corrected decoded image by adding the correction value to the each pixel value of the decoded image;

detecting a motion vector of the original image;

performing generation of the predicted error signal from the motion vector and the corrected decoded image; and coding the predicted error signal.

6. The video coding method according to claim 5, the the determining of the correction value comprises:

generating candidates for the correction values corresponding to the edge group and the noise group, respectively, based on the the coding error for the edge group, the first weight, the coding error for the noise group, and the second weight;

calculating, for each of the candidates for the correction value, square errors which respectively correspond to the edge group and the noise group and each of which is for the decoded images and the original images; and selecting one candidate from the candidates for the correction value based on a weighting sum of the square error corresponding to the edge group and the square error corresponding to the noise group and thereby determining the correction value.

7. The video coding method according to claim 6, the video the determining of the correction value further comprises:

calculating a code amount of the candidates for the correction-values, wherein the one candidate is selected further based on the code amount.

8. The video coding method according to claim 6, wherein the candidates for the correction values are generated by using a sum of a value obtained by multiplying the first weight by the coding error for the edge group and a value obtained by multiplying the second weight by the coding error for the noise group.

9. A non-transitory computer-readable medium having stored therein a program for causing a computer to execute a video coding process for generating a predicted error signal from a comparison between a decoded image obtained by performing decoding after coding an original image and the original image and coding the predicted error signal, the video coding process comprising:

calculating a decoded image edge index that represents a type of an edge shape of the decoded image;

calculating an original image edge index that represents a type of an edge shape of the original image corresponding to the decoded image;

comparing the decoded image edge index and the original image edge index and categorizing the edge shape of the decoded image into an edge group in which an edge direction of the original image and an edge direction of the decoded image are the same or into a noise group in which an edge direction of the original image and an edge direction of the decoded image are different;

calculating as a coding error for the edge group, a cumulative value of coding errors for each of the decoded images with edge shapes categorized into the edge group;

calculating, as a coding error for the noise group, a cumulative value of coding errors for each of the decoded images with edge shapes categorized into the noise group;

determining a correction value based on the coding error for the edge group, a first weight given to the coding error for the edge group, the coding error for the noise group, and a second weight given to the coding error for the noise group, the first and second weights being set in such a manner that the coding error for the edge group contributes to the correction value more than does the coding error for the noise group;

generating a corrected decoded image by adding the correction value to the each pixel value of the decoded image;

detecting a motion vector of the original image;

performing generation of the predicted error signal from the motion vector and the corrected decoded image; and coding the predicted error signal.

10. The non-transitory computer-readable medium according to claim 9, the determining of the correction value comprises:

generating candidates for the correction values corresponding to the edge group and the noise group, respectively, based on the the coding error for the edge group, the first weight, the coding error for the noise group, and the second weight;

calculating, for each of the candidates for the correction value, square errors which respectively correspond to the edge group and the noise group and each of which is for the decoded images and the original images; and selecting one candidate from the candidates for the correction value based on a weighting sum of the square error corresponding to the edge group and the square error corresponding to the noise group and thereby determining the correction value.

11. The non-transitory computer-readable medium according to claim 10, the determining of the correction value further comprises:

calculating a code amount of the candidates for the correction-values, wherein the one candidate is selected further based on the code amount.

12. The non-transitory computer-readable medium according to claim 10, wherein the candidates for the correction values are generated by using a sum of a value obtained by multiplying the first weight by the coding error for the edge croup and a value obtained by multiplying the second weight by the coding error for the noise group.

* * * * *